United States Patent
McCabe et al.

(10) Patent No.: US 7,983,981 B1
(45) Date of Patent: Jul. 19, 2011

(54) EXCHANGE TRADED FUNDS AND MUTUAL FUNDS PROVIDING CASH FLOW DISTRIBUTIONS

(75) Inventors: Daniel Joseph McCabe, Upper Saddle River, NJ (US); John Stuart Thomas, Morristown, NJ (US); Mark Steven Criscitello, Colts Neck, NJ (US); Paul Edward Kuhnle, Doylestown, PA (US); George Tedesche Simon, Evanston, IL (US)

(73) Assignee: M7Ventures, LLC, Bedminster, NJ (US)

( * ) Notice: Subject to any disclaimer, the term of this patent is extended or adjusted under 35 U.S.C. 154(b) by 0 days.

(21) Appl. No.: 12/337,618

(22) Filed: Dec. 17, 2008

Related U.S. Application Data

(63) Continuation-in-part of application No. 11/279,848, filed on Apr. 14, 2006, now abandoned.

(51) Int. Cl.
*G06Q 40/00* (2006.01)
(52) U.S. Cl. ............................. 705/37; 705/35; 705/36 R
(58) Field of Classification Search ............... 705/35–37
See application file for complete search history.

(56) References Cited

U.S. PATENT DOCUMENTS

| | | | |
|---|---|---|---|
| 2004/0044609 A1* | 3/2004 | Moore | 705/37 |
| 2004/0186803 A1* | 9/2004 | Weber et al. | 705/35 |
| 2005/0108120 A1* | 5/2005 | Malka et al. | 705/35 |
| 2005/0108146 A1* | 5/2005 | Bond | 705/37 |
| 2005/0187857 A1* | 8/2005 | Tull, Jr. | 705/37 |
| 2005/0192889 A1* | 9/2005 | Sauter et al. | 705/37 |
| 2005/0222941 A1* | 10/2005 | Tull, Jr. | 705/37 |
| 2005/0262010 A1* | 11/2005 | Tull et al. | 705/37 |
| 2006/0080205 A1* | 4/2006 | Starr | 705/35 |
| 2006/0100955 A1* | 5/2006 | Baldassini et al. | 705/37 |
| 2007/0106579 A1* | 5/2007 | Al-Saleh | 705/35 |
| 2007/0239584 A1 | 10/2007 | Fross et al. | |

* cited by examiner

*Primary Examiner* — Jagdish N Patel
*Assistant Examiner* — Sara Chandler

(57) ABSTRACT

A collective investment vehicle that provides cash distributions. The distributions provide a cash flow to holders of the collective investment vehicle securities, and also allow the value of the collective investment vehicle securities to be reset to a target level. The distributions may be scheduled to occur periodically, or may be based on the occurrence of specific events including company events, economic events, political events, etc. In some embodiments, the funds required for cash distributions are obtained without incurring any capital gains, and the distributions may be treated as a return of capital.

19 Claims, 9 Drawing Sheets

EXCHANGE TRADED FUNDS AND MUTUAL FUNDS PROVIDING CASH FLOW DISTRIBUTIONS

RELATED APPLICATIONS

The present application is a continuation-in-part of, and claims priority under 35 USC §120 to, U.S. patent application Ser. No. 11/279,848, entitled "Exchange Traded Funds and Mutual Funds Providing Cash Flow Distributions", filed Apr. 14, 2006, the entire contents of which are hereby incorporated herein by reference.

FIELD OF THE INVENTION

The present invention relates to collective investment vehicles.

BACKGROUND

Mutual Funds are one type of collective investment vehicle. Mutual Funds typically obtain money from investors, and use it to purchase securities such as company stocks, bonds, or other securities. The mutual fund issues shares to the investors, and the shares are valued as a pro-rata portion of the net asset value (NAV) of the Mutual Fund. The investors may redeem the shares for cash or for the underlying securities held by the Fund. The Mutual Fund manager may trade the asset securities from time to time in an attempt to improve the performance of the Fund's portfolio, or to ensure that the securities held by the Fund accurately reflect the Fund's overall investment strategy.

One problem with Mutual Funds is that the sale of securities by the manager may result in capital gains that must be distributed to the shareholders of the Fund, even though the investors did not sell their Fund shares. Many investors would prefer to defer the receipt of capital gains and the associated tax liability until they sell their shares of the Mutual Fund. Therefore, to reduce the capital gains tax liability for the shareholders, Mutual Fund managers typically sell relatively higher cost basis securities when sales are necessary to obtain cash to pay distributions or honor redemptions, or when positions are changed, such as during a portfolio rebalancing. As a result of many years of trading in a way to reduce the capital gains distributions to shareholders, the U.S. mutual fund industry has amassed embedded capital gains in the hundreds of billions of dollars. The unrealized capital gains in these Funds increase an investor's expected future capital gains distribution, making the Mutual Funds less attractive to investors. In particular, the embedded capital gains become a major liability in the event of large redemption activity. In addition, the embedded capital gains may adversely affect the investment decisions of a fund manager, who might prefer to reduce or eliminate certain stock positions but for the adverse impact of incurring a taxable gain on the sale of the position.

Another fund structure, the exchange traded fund (ETF), is able to hold securities over long periods of time without developing excessive unrealized capital gains. The ETF issues shares in a creation event by exchanging them for baskets of securities. When the ETF shares are ultimately redeemed for a basket of securities, the securities provided by the ETF may be those having a relatively low cost basis without having adverse tax consequences. This is because the exchange of the ETF shares for the basket of securities is deemed to be a like kind exchange that does not create a taxable event for the ETF. Similarly, the entity receiving the basket of securities receives them at a cost basis of the current market value.

One disadvantage of the ETF is that the ETF shares are created in bulk: the baskets of securities are typically valued in millions of dollars. While the resulting shares of the ETF are traded on an exchange, the creation and redemption events involve millions of dollars, making them unavailable to most investors. Furthermore, the ETF structure does nothing to address the problem of capital gains overhanging in existing mutual funds.

Consequently, an improvement is desired.

BRIEF SUMMARY OF THE INVENTION

A collective investment vehicle is described. The collective investment vehicle preferably provides distributions so that the value of the collective investment vehicle securities may be reset to a target level, or may be reset in accordance with a target distribution. The distributions may be scheduled to occur periodically, or may be based on the occurrence of specific events including company events, economic events, political events, etc. In some embodiments, the funds required for cash distributions are obtained without incurring any capital gains, and the distributions may be treated as a return of capital.

In one preferred method, the collective investment vehicle issues securities. The assets are preferably securities of one or more types, including stocks, bonds, and notes, and/or shares of other funds, such as mutual funds, or commodities, currencies, derivatives, or instruments based upon any of the foregoing instruments. Then, when a trigger event occurs, such as a calendar event, economic event, or other event, a distribution is made. Preferably, the distribution is made by determining a target value for the distribution amount, which may be set by the terms of the collective investment securities which may provide for a fixed distribution amount, a fixed percentage of the asset value, or other amounts as described herein. Alternatively, the distribution amount may be determined with reference to a desired post-distribution target value for the collective investment securities. The selected asset securities are then redeemed to obtain the distribution funds, and the distribution funds are provided to holders of the collective investment securities. After the distribution, the value of the collective investment securities is reset in accordance with the overall reduction in asset value.

In an alternative embodiment, the method of administering a collective investment vehicle includes providing a collective investment vehicle having assets comprising shares of at least one fund, and issuing collective investment vehicle securities; redeeming an amount of the shares of at least one fund in exchange for underlying fund securities; selling the underlying fund securities to obtain distribution funds; providing the distribution funds to holders of the collective investment vehicle securities; and, adjusting the value of the collective investment vehicle securities.

In yet another alternative embodiment, a method of administering a collective investment vehicle includes issuing shares of a collective investment vehicle, the collective investment vehicle having assets comprising securities issued by at least one other collective investment vehicle; receiving buy and sell orders for the securities of the collective investment vehicle, and netting the buy orders and sell orders to determine a net order; if the net order is a buy order, then buying additional securities of the at least one other collective investment vehicle; if the net order is a sell order, then redeeming securities of the at least one other collective investment vehicle in exchange for the underlying assets held by the at least one other collective investment vehicle, and selling those underlying assets.

These as well as other aspects, advantages, and alternatives will become apparent to those of ordinary skill in the art by reading the following detailed description, with reference where appropriate to the accompanying drawings.

DETAILED DESCRIPTION

Figure 1:
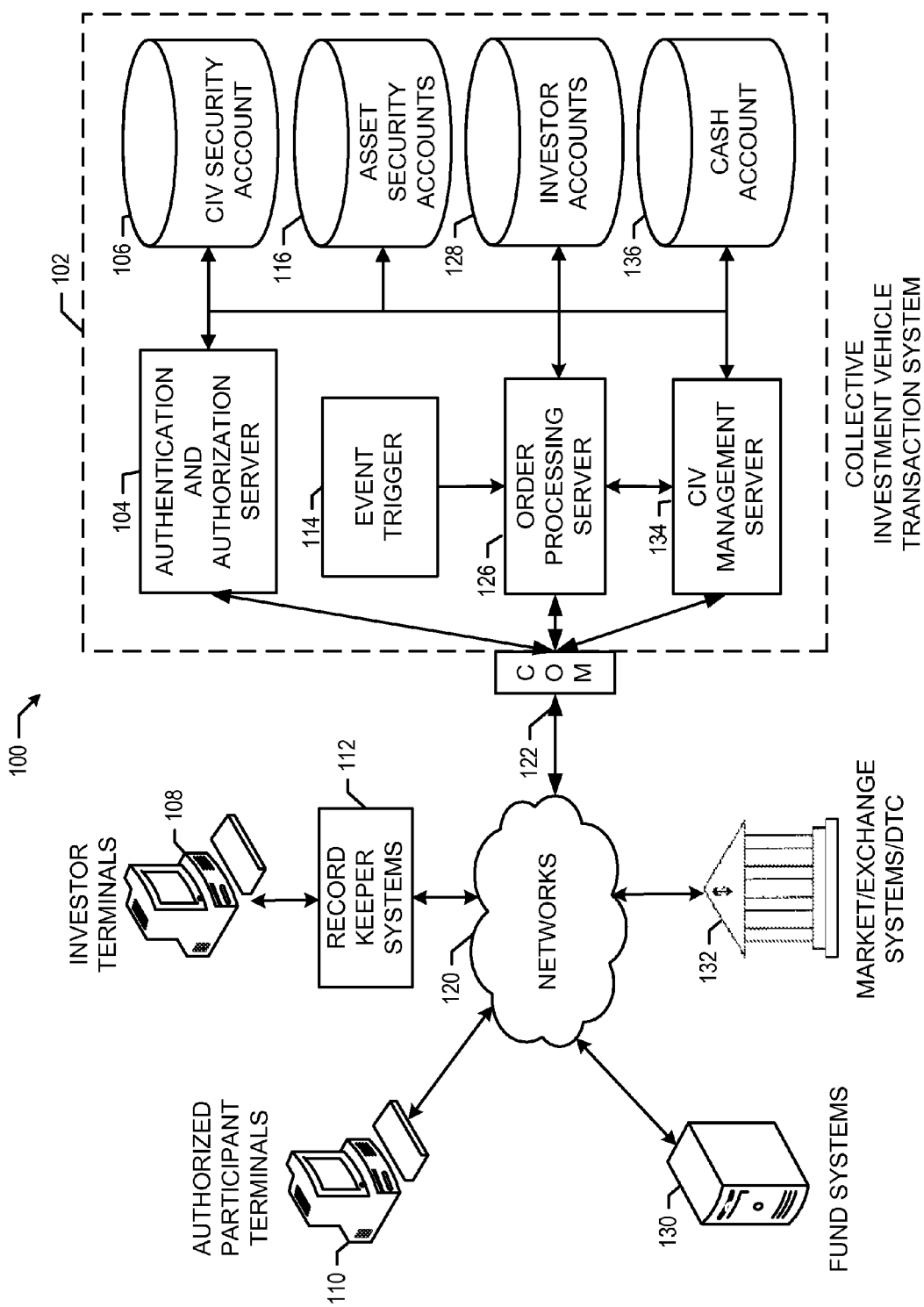
FIG. 1 is depicts one embodiment of the collective investment vehicle (CIV) transaction system.

FIG. 1 depicts one embodiment of the collective investment vehicle transaction system described herein. The system 100 may include a collective investment vehicle (CIV) system 102, a plurality of investor terminals 108, a plurality of record keeper systems 112, a plurality of authorized participant (AP) terminals 110, a plurality of fund systems 130 such as mutual fund systems, and a plurality of market/exchange systems 132 such as the NASDAQ system and the NYSE system, and the DTC. The record keeper systems 112, AP terminals 110, fund systems 130, and market/exchange systems 132 interface to the collective investment vehicle (CIV) system 102 as described herein via one or more networks 120 and one or more connections 122.

In another embodiment, each of the connections 122 may comprise a plurality of physical interfaces having transceiver devices (such as for communicating TCPC/IP over gigabit ethernet over copper or fiber physical links, or for networks utilizing ATM, Frame Relay, or the like) for transmitting and receiving information such as buy and sell orders. In still another embodiment, networks 120 may include public networks, private networks, virtual private networks (VPNs), and proprietary connections as well known in the financial transaction industry.

In still another embodiment, each of the record keeper systems 112 may include one or more of the following: a broker system, an investor account, a trustee system, and a bank database.

In still another embodiment, the CIV system 102 may include an authentication and authorization server 104, an order processing server 126, a CIV management server 134, and numerous electronic databases including a CIV security account 106, a cash account 136, a plurality of asset security accounts 116, and a plurality of investor accounts 128. Each of the electronic databases may be queried according to an SQL language or a custom querying method. The asset security accounts 116 may include a plurality of fund-issued security accounts and a plurality of fund underlying security accounts (not shown). Each of the electronic databases may take such form as SQL database or other electronic record formats that are well known in the accounting industry. In addition, all accesses to the CIV security account 106, the cash account 136, the asset security accounts 116, and the investor accounts 128 are subject to authentication and authorization issued by the authentication and authorization server 104.

In still another embodiment, the CIV system 102 may include an event trigger 114 for internally generating events input to an order processing server 126 to trigger distributions. Events for triggering distributions may also be received by the order processing server 126 via networks 120 and connections 122.

In still another embodiment, the CIV system 102 may use one or more computers to perform the various functions described herein. For example, the authentication and authorization server 104, the order processing server 126, the CIV management server 134, and the various accounts including the CIV security account 106, the asset security accounts 116, the investor accounts 128, and the cash account 136 may reside on separate computers/servers, while the event trigger 114 may share the same computer/server with the order processing server 126.

In still another embodiment, the event trigger 114 may reside on a separate computer/server connected to the order processing server 126. In still another embodiment, the CIV management server may include a database management system (DBMS) that is a set of computer software such as Oracle and Microsoft SQL Server, for managing numerous databases. In still another embodiment, the CIV management server 134 may communicate to the investor terminals via the networks 120 and the connections 122, sending account information and transaction information to investors in the form of electronic mail (e-mail) messages, or via web server, using http, html, xml, active server pages, and the like.

In still another embodiment, the CIV system 102 may be accessible to the authorized participant that operates the AP terminals 110, the fund systems 130, and the market/exchange systems 132. The terminals 110 may utilize a web interface to communicate with the CIV computer system using hypertext markup language (HTML), extensible markup language (XML), a database markup language (DBML), carried via standard networking protocols such as hypertext transfer protocol (HTTP), transfer control protocol over internet protocol (TCP/IP), or other suitable protocols. The communication may also utilize a client server communication channel that does not use a web interface, but uses a custom interface, if desired.

Figures 2A, 2B:
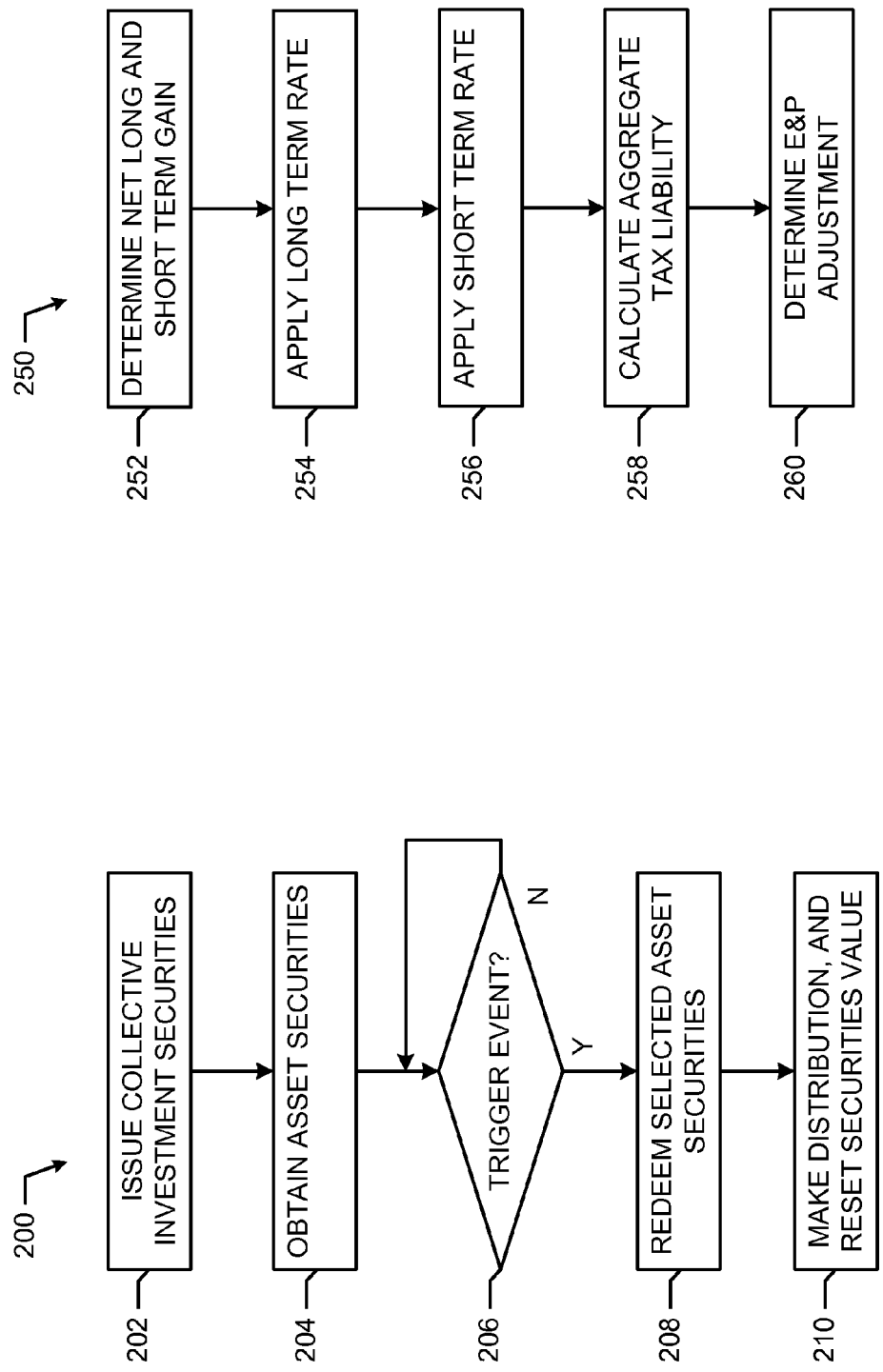
FIG. 2A is a flow chart depicting certain aspects of preferred collective investment vehicles.
FIG. 2B is a flow chart depicting certain aspects of Earnings & Profits determinations.

With reference to FIG. 2A, a preferred method 200 of administering a collective investment vehicle will be described. At step 202, securities are issued by the collective investment vehicle through the CIV system 102. The collective investment vehicle may take the form of an open ended fund, a unit investment trust, a grantor trust, a limited liability company, a limited liability partnership, or any other type of investment vehicle. In one embodiment, an administrator or manager of the CIV utilizes a Depository Trust Company (DTC) terminal, such as a dedicated terminal, or personal computer running DTC software, or similar system, which may be connected via a dedicated communication line to the DTC, to transmit electronic messages to create additional book entry shares of the CIV. The CIV manager may utilize the terminal/software to transmit data indicating the owner of the newly created shares. In one embodiment, the terminal formats a message including a data field indicating the new owner. In ETF embodiments, the new owner will be the AP participating in the creation event.

The collective investment vehicle securities may be offered to investors either directly or through an Exchange such as the market/exchange systems 132. Preferably, the collective investment vehicle securities are in the form of shares; however, the securities may also be bonds and/or notes, or other suitable instrument, such as commodities, currencies, derivatives, or instruments based upon any of the foregoing instruments. In a further alternative embodiment the collective investment vehicle may issue multiple classes of securities. In one such embodiment, the collective investment vehicle may issue both exchange traded shares and shares that are redeemable with the collective investment vehicle on the basis of a net asset value (NAV). One such prior art multiple-share-class company is described in U.S. Pat. No. 6,879,964, assigned to the Vanguard Group, Inc., the contents of which are hereby incorporated herein by reference.

The collective investment vehicle securities may be valued according to a NAV, or the pricing may be determined by the market in the case of exchange traded securities. At step 204, the collective investment vehicle obtains asset securities, preferably in the form of stock of publicly traded companies, bonds, notes, and or shares of other investment vehicles, such as shares of mutual funds, or commodities, currencies, derivatives, or instruments based upon any of the foregoing instruments.

In one embodiment, the CIV manager uses the CIV management server 134 to identify which securities to purchase. The CIV server 134 provides an interface allowing the manager to enter security identifiers (via, e.g., selecting symbols from drop down boxes, etc.) and quantity data. The system may provide a recommended default set of securities to acquire. The system may then submit orders for securities in the form of electronic transaction messages via order processing server 126. These orders are in the form of electronic trade requests as described herein.

Reset Distributions

The collective investment vehicle is configured to provide the cash flow to its investors. The distributions may be triggered by various types of trigger events received at the order processing server 126, including calendar events, collective investment vehicle performance events, company events, political events, social events, economic events, natural events, etc. The wide variety of the distribution trigger events allows great flexibility in designing collective investment vehicles having the desired characteristics. Events may be generated internally by the event trigger 114 of the CIV system or received via the networks 120 and the connections 122. A trigger event may also be initiated by an administrator or manager.

Calendar events include distributions based on regular periodic events, such as distributions occurring daily, weekly, monthly, quarterly, semiannually, annually, biennially, or longer. CIV management server 134 may include a calendaring application that detects calendar events an initiates an event trigger 114. In some embodiments, the calendar event may be further conditioned on a threshold event. For example, the investor may elect to begin distributions only after a certain date threshold (e.g., the investor's retirement date or $65^{th}$ birthday), after which time, the distributions occur regularly. In other embodiments, the distributions are not elective, and occur automatically for all shareholders.

Economic events may include a predetermined change in (or simply the reporting of) various economic indicators that are well known to those of skill in the art. These indicators may include the federal funds rate, inflation rate, unemployment number, unemployment rate, personal income, US Treasury yield rates, consumer credit levels, gross domestic product, housing starts, or stock index. The system obtains pricing and news data feeds from numerous sources, and receives electronic messages containing the data described above that is indicative of the event, or data upon which the event determination is made by the computer system 102 analysis of the data according to event trigger 114.

Collective investment vehicle performance events include predetermined levels of change in the collective investment vehicle assets (gain or loss). That is, the collective investment vehicle may be configured to provide a distribution only when a certain level of gain or loss in the asset securities has occurred. The computer system 102 may query the database 116 to determine the security quantity and price information, analyze the asset security values, and determine that a sufficient amount of gain has been achieved. This may be done by the computer performing a comparison of the amount of gain calculated to a predetermined amount of gain, or threshold, and then initiating a trigger event via event trigger 114.

Political/Social events may include elections, election results, military conflict, terrorist activities, civil unrest, legal rulings or other indicators of investment risk. These indicators may be provided via a data feed, or via a user interface of a computer system such as CIV management server 134.

Company events may include stock splits or announcements of stock splits, dividends distributions or announcements of dividend amounts, earnings announcements, and other company events as known to those of skill in the art.

Natural events may include weather events such as regional amounts of rainfall or snowfall, temperatures, wind speeds, hurricanes, tornadoes, and may also include other natural disasters such as tidal waves, earthquakes, fires, etc. Again, these company events, natural events, and other trigger data parameters may be provided by direct data feed, or may be input via a user interface such as CIV management server 134.

Distribution Amount

Computer system 102 determines a distribution amount. In some preferred embodiments, the distribution is intended to provide a known income stream. The distribution target may be a fixed amount at the occurrence of the trigger event, or may be a fixed percentage of the asset value (in some cases regardless of gains or losses associated with the collective investment assets). The distribution target may also be a percentage of the gain associated with the collective investment assets. Elements of computer system 102, such as CIV management server 134, determines the distribution amount by querying a data store to obtain the necessary parameters depending on the selected distribution plan, such as the fixed distribution amount, the percentage of asset value, data necessary to calculate asset value, data necessary to calculate asset gain or loss, and the like.

In some alternative preferred embodiments, the distribution is intended to reset the value of the collective investment vehicle securities to a predetermined value. The predetermined value may be a fixed amount, such as $100 per share. For example, the collective investment vehicle may be configured to provide a target distribution of any amount in excess of $100 per share. Components of computer system 102, such as CIV management server 134, may calculate the NAV at the end of the day during which a trigger event occurred by querying the asset security database 116 to obtain position information including security quantity and price data. The price data may be obtained from a separate data provider, or pricing agent. The computer then calculates the amount that the NAV exceeds the target value to determine a total distribution amount and/or a per share distribution amount.

The distribution may be triggered as a periodic calendar event, and at each distribution an amount of cash is provided to the holders of the securities so as to reset the value of the collective investment securities to the desired predetermined value. In the case of trigger events related to an amount of gain associated with the collective investment vehicle assets, the amount of the distribution may be the entire gain, or a predetermined percentage of the gain, such as 50% or 90%. The computer system 102, such as CIV management server 134, may determine the amount of gain since the last distribution by comparing the current NAV to the NAV after the last distribution.

As an alternative, a floating predetermined value may be used. The floating predetermined value may be determined, for example, with respect to an index or other indicator.

In this way the distributions may be set so that the price of the collective investment vehicle tracks the overall performance of a desired index, such as the NASDAQ 100, the Dow Jones, the S&P 500, etc. The CIV management server 134 may obtain index values from electronic messaging via a data feed. The floating predetermined value may also be determined with respect to the amount of loss in the collective investment vehicle assets. In this way collective investment vehicle assets may be liquidated in the event of a predetermined amount of loss.

The collective investment fund may utilize reverse splits in order to increase the value of the securities. That is, if the collective investment vehicle securities decrease in value they may be periodically reset to a predetermined value, such as $100. Once reset by a reverse split, the securities are more likely to qualify for future reset distributions for those embodiments in which the distributions are triggered by the performance of the collective investment vehicle assets, or where the amount of the target distribution is determined in response to the collective investment vehicle performance. The CIV management server 134 may query database 128 to determine the number of shares owned by various investors, and then determine a new number of shares for each shareholder by applying a reverse split factor and truncating the result. The CIV management server 134 may then send DTC electronic messages to alter the book entries to indicate the new share ownership after the reverse split.

In addition, a distribution reinvestment program may be implemented to allow holders of the collective investment securities to automatically reinvest any distributions into the collective investment vehicle or another investment vehicle. The computer system 102 may store dividend reinvestment instructions indicating how share holders wish the CIV to treat any dividends and/or distributions. Upon receipt of an electronic dividend notification from the DTC, the CIV management server may direct the dividend payment accordingly: the system 102 may initiate an electronic funds transfer to pay the dividend/distribution to the shareholder, or it may retain the dividend (or a portion thereof, according to the instructions) and reinvest it in CIV shares.

Selection of Asset Securities

After the occurrence of a trigger event at step 206, selected asset securities are redeemed to obtain distribution funds. The amounts of asset securities that are selected are determined in part in response to the amount of cash needed to make the target distribution. In addition, however, the selection of which asset securities to liquidate may be made in response to the type of trigger event. The occurrence of weather events may induce the sale of asset securities relating to crops, or the sale of asset securities relating to companies located in the affected areas; political events may induce the sale of asset securities associated with entities located in the affected regions or countries; economic events may induce the sale of securities sensitive to the respective economic indicators, etc.

In addition, asset securities may be selected based on the cost basis of the asset securities. In some embodiments, high cost basis securities may be selected so as to minimize capital gains to the holders of the collective investment vehicle securities. In other embodiments, however, the asset securities may be redeemed without incurring any capital gains, thus low cost basis securities may be selected for liquidation.

In one embodiment, the earnings and profits (E&P) of the fund are analyzed by the computer system 102, and it selects a set of asset securities in response to the E&P. The E&P of the fund is affected by dividends and other gains received through trading, as well as other transactions and events known to those of skill in the art. In one embodiment, the current E&P is compared to a desired, or target E&P value, and a computer algorithm running on a computer within computer system 102 performs an analysis to identify a set of asset securities that will impact the E&P in a desired fashion. For example, it may be desirable to have E&P as small as possible, or be as close to a specific predetermined value as possible. The predetermined value may be based on a percentage of the CIV asset value (overall value, or on a per share basis). The computer may query the asset security database 116 to obtain lot information (purchase prices, date acquired, etc.) and perform a global search of all combinations of asset securities and select the combination of lots that most closely attains the desired result. The CIV management server 134 may automatically select the assets, or it may present a number of possible combinations of assets to liquidate, and final selection may be made by the fund manager.

In one embodiment shown in FIG. 2B, the E&P target is evaluated in terms of a net taxable effect by analyzing long term and short term E&P entries. In the computer analysis of E&P, the computer (such as e.g., the CIV management server 134, or other suitable computing platform) may implement the method 250. At step 252 it determines net long term and short term capital gains values, and multiplies long term gains by the current long term capital gains tax rate to obtain a long term E&P tax liability (254), and multiplies short term gains by the short term tax rate (which is, in one embodiment, the current tax rate for the highest income tax bracket, but other values such as a predetermined target tax rate, or a blended bracket tax rate may be used) to obtain a short term E&P tax liability (256). The computer then calculates the aggregate tax liability for the fund (258). The aggregate tax liability may be used to determine if the current E&P is acceptable or if it needs to be adjusted (260). For example, the E&P may be determined to be too high, too low, or within an acceptable range.

In CIVs that utilize an in-kind exchange mechanism for creation events and/or redemption events, the E&P analysis may include E&P entries due to these exchanges. For example, in and ETF-CIV, a redemption of CIV shares in exchange for asset securities may result in an E&P gain or loss, depending on the price at acquisition. Furthermore, in the event that there is an E&P carryover from the prior year, it may also be factored in to the determination of which assets to liquidate.

Redemption

The selected asset securities are then liquidated at step 208 through the market/exchange systems 132. In one embodiment the step of redemption is performed by selling the asset securities on the market. Preferably, the order processing server 126 transmits electronic trade requests. The server 126 formulates the electronic transaction message, which may include an exchange identifier, a security identifier, a quantity, and a price. If the asset securities are shares of company stock or bonds, they may be sold through an exchange in order to obtain the distribution funds. In this case, it is likely that the high cost basis securities will be selected for liquidation, since any gain associated with the sale of the selected asset securities would likely be deemed a capital gain for the holders of the collective investment securities.

In an alternative embodiment, the asset securities may be shares of another investment vehicle, such as a mutual fund. In this case, the collective investment vehicle asset securities (i.e., the mutual fund shares) may be exchanged for the underlying securities held by the mutual fund through the fund systems 130 or the market/exchange systems 132. In one embodiment, the CIV administrator or manager may use the computer system 102 to transmit a redemption request to the other investment vehicle. Depending on the facilities provided by the other investment vehicle, the administrator may use a web-based system or an interactive voice response unit (IVRU) to transmit data indicating a redemption of investment vehicle assets.

The underlying securities are obtained from the other fund such as by a DTC book entry transfer. The CIV computer system 102 may receive a DTC message indicating that the transfer has occurred. The underlying securities (which are typically assorted company stocks) may then be sold in the market in order to obtain the distribution funds. This embodiment has the advantage of providing a method of decreasing the embedded capital gains associated with the mutual fund. In particular, the redemption of the mutual fund shares for the underlying fund securities may be treated as a like kind exchange, which is not a realization event for purposes of determining taxes due by the mutual fund.

In step 210, the distribution is made to the holders of the collective investment vehicle securities. This may be accomplished by sending an electronic message to the DTC containing dividend instructions along with an electronic funds transfer. The value of the collective investment vehicle securities is reset, preferably according to the new NAV as determined by computer system 102. In one embodiment, the new value is substantially equal to any target value that had been previously determined. That is, the new value is within a few percent of the target value. In other embodiments, such as a fund with a fixed payout rate, there may be no specific desired target. In some embodiments, especially in the case where the collective investment vehicle is an exchange traded fund, the collective investment vehicle security value may be implicitly reset by market forces.

Order Aggregation

In still other embodiments of the collective investment vehicle, the benefits of engaging in like kind exchanges to reduce capital gains may be obtained through order aggregation. In this embodiment, buy and sell orders for the collective investment vehicle securities may be aggregated at the order processing server 126, preferably over the course of the day. If the net order is a buy order, and the collective investment vehicle simply purchases additional shares of the asset securities, which may be mutual fund shares associated with one or more mutual funds. If the net order is a sell order, then the collective investment vehicle may redeem shares of the mutual fund(s) in exchange for the underlying securities held by the mutual fund(s).

Figure 3:
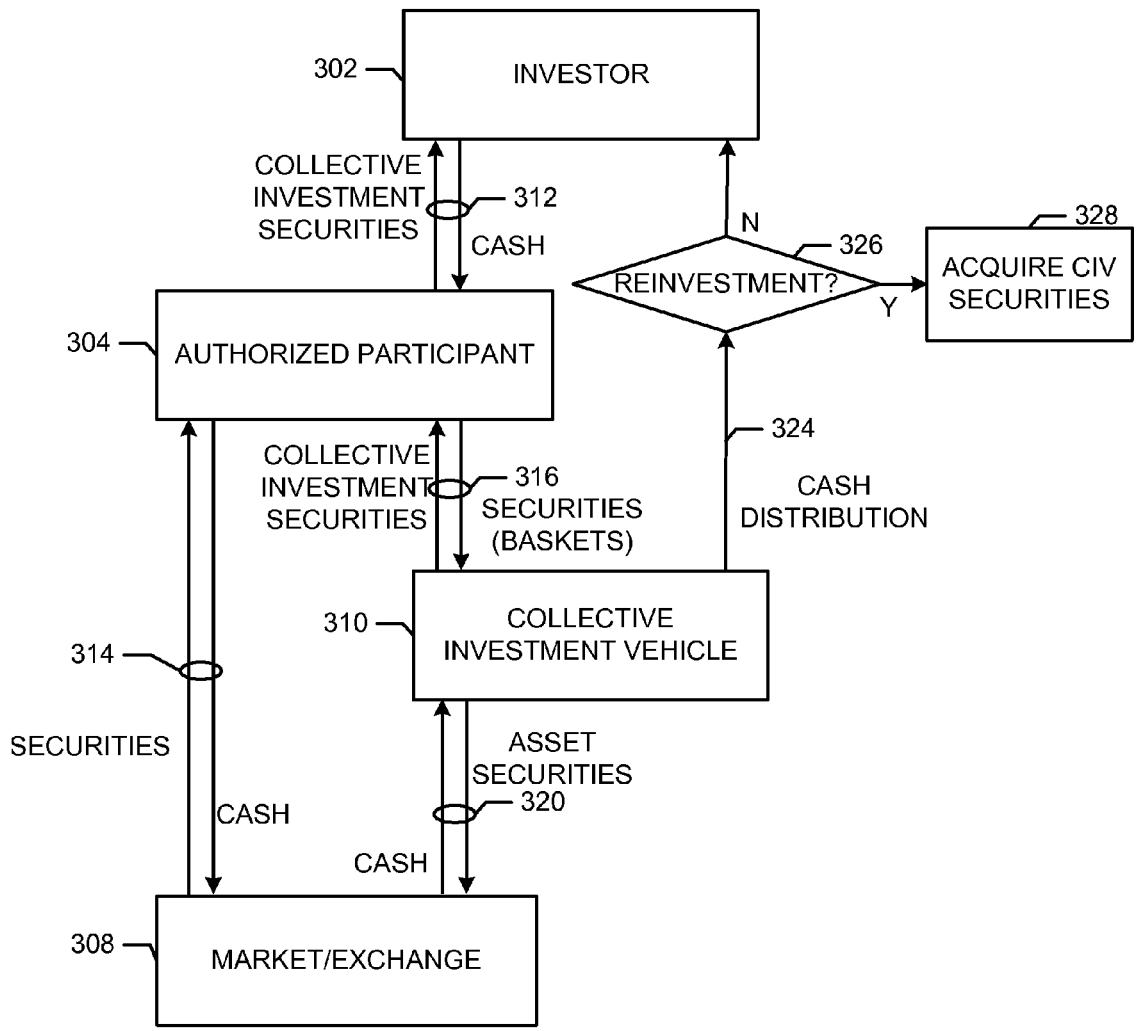
FIG. 3 is a block diagram depicting certain aspects of one preferred collective investment vehicle in the form of a cash flow exchange traded fund (CF-ETF).

With respect to FIG. 3, one preferred embodiment of a method of administering a collective investment vehicle in the form of a cash flow exchange traded fund (CF-ETF) will be described. Authorized participant (AP) 304 obtains securities in exchange for cash as shown in transaction 314 with the market/exchange 308. In one embodiment, the cash is provided by initiating an electronic funds transfer via electronic messaging. The AP 304 provides baskets of the securities in exchange for shares of the collective investment vehicle 310 as shown by transaction 316. The security transfer transactions from the AP to the CF-ETF may be performed by transmitting electronic messages to the DTC to make a book entry transfer designating the new owner. The shares of the collective investment vehicle CF-ETF may be created by the manager of the collective investment vehicle 310 using a computer or DTC terminal to send electronic messages indicating that new shares should be created. The AP 304 then sells collective investment securities to investors 302 in exchange for cash as shown by transaction 312. Of course, the AP may have already sold equivalent CF-ETF shares (shorting them), and offset his short position through the creation event. Alternatively, investor 302 may obtain collective investment securities on the secondary market through market/exchange 308 (not shown). When a distribution is desired, the collective investment vehicle 310 may liquidate certain asset securities, preferably by selling the selected asset securities on the market/exchange 308 in exchange for cash, as shown by transaction 320. In the embodiment shown in FIG. 3, it may be preferable to select asset securities having a high cost basis to reduce the tax implications for holders of the collective investment securities. The collective investment vehicle 310 then makes a cash distribution as shown by transaction 324. The collective investment vehicle 310 may offer an optional distribution reinvestment program as shown by decision block 326. If the distribution reinvestment option is selected, the distribution funds may be used to acquire additional collective investment securities from collective investment vehicle 310, or from any other collective investment vehicle offered as part of the reinvestment plan.

Figure 4:
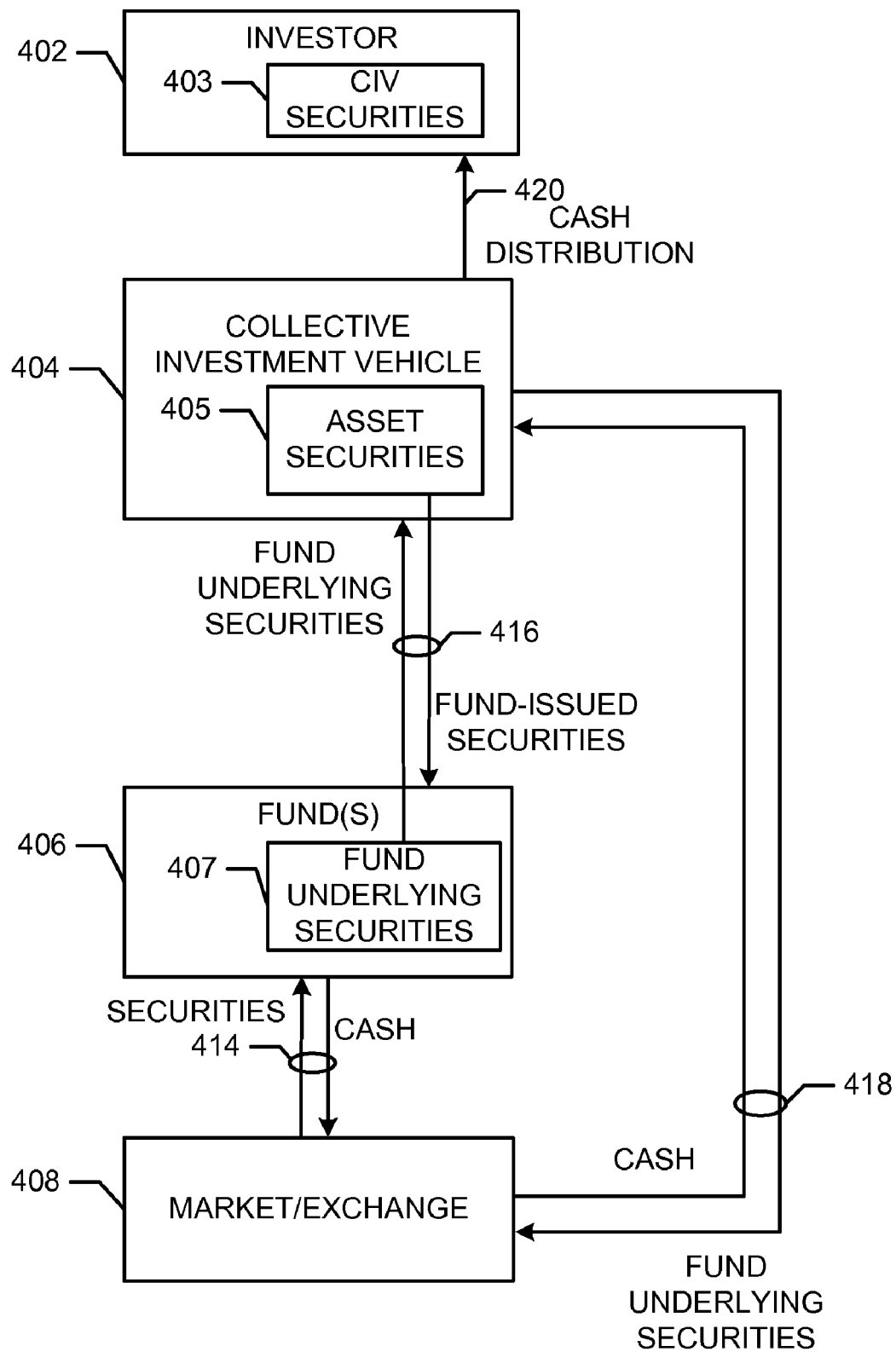
FIG. 4 is a block diagram depicting certain aspects of an alternative preferred collective investment vehicle that holds assets in the form of fund issued securities from one or more funds.
Figure 5:
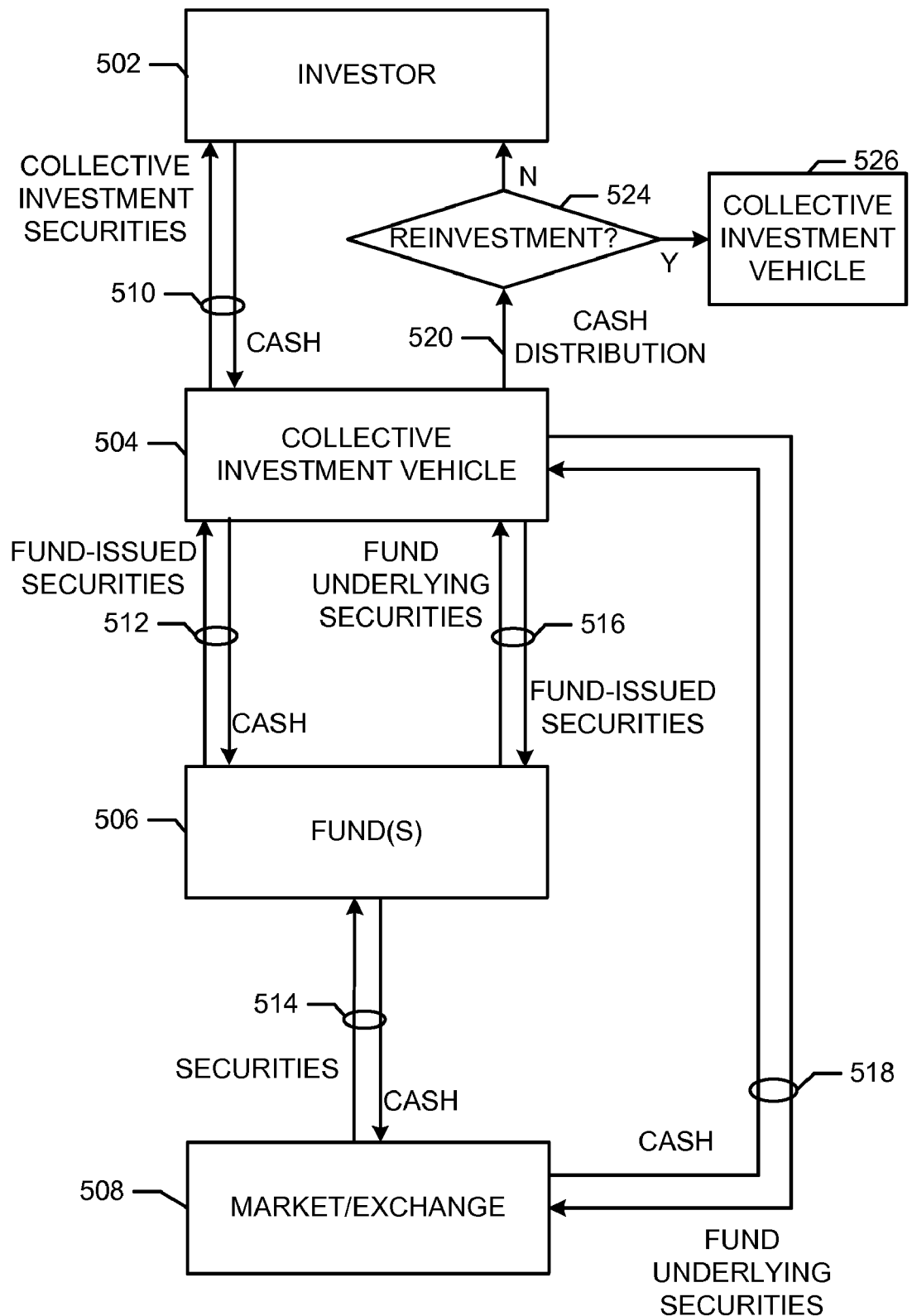
FIG. 5 is a block diagram depicting certain aspects of one type of cash flow mutual fund (CF-MF).
Figure 6:
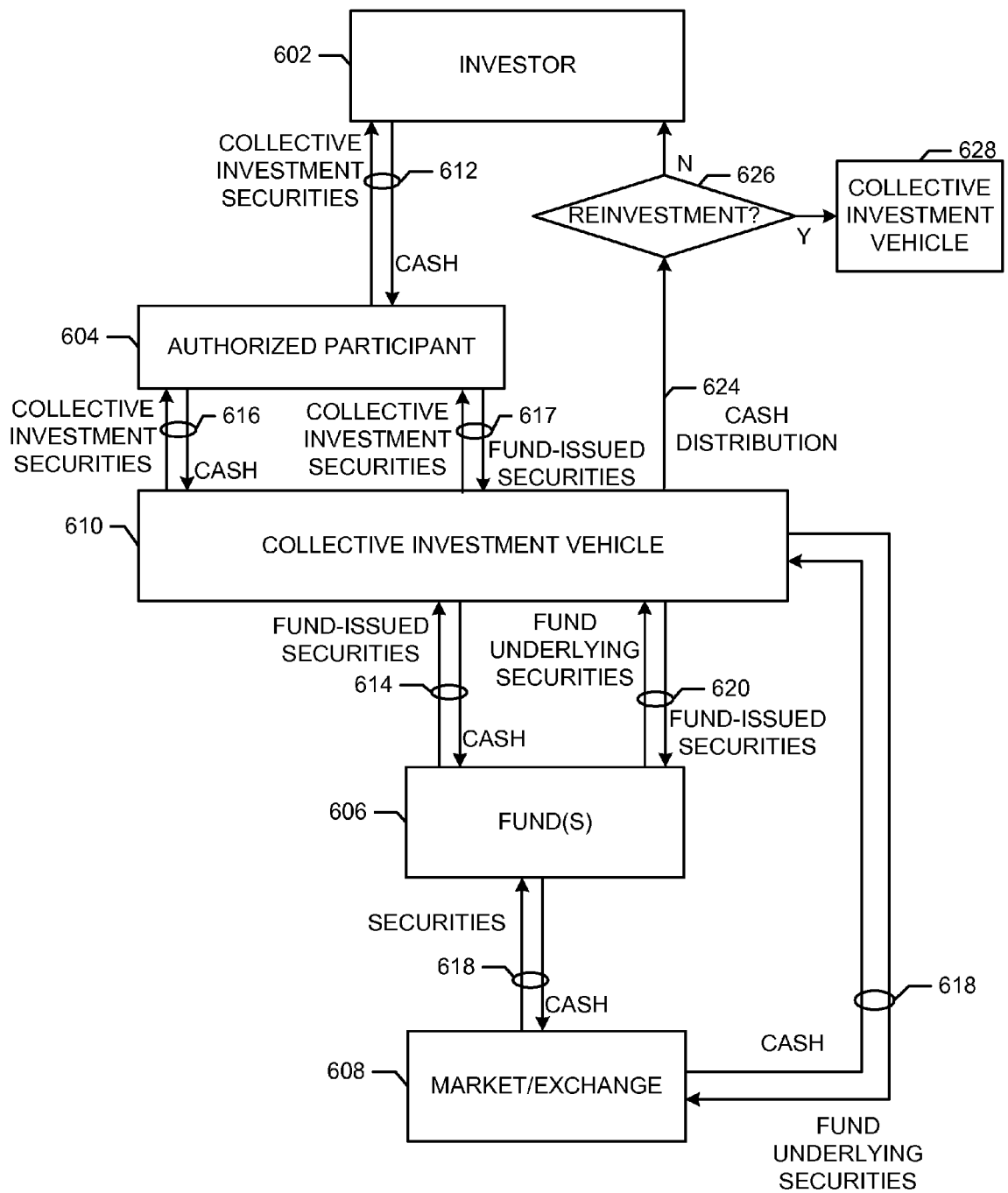
FIG. 6 is a block diagram depicting certain aspects of one type of CF-ETF.

With respect to FIG. 4, some alternative preferred embodiments of methods of administering a collective investment vehicle will be described. Securities 403 issued by the collective investment vehicle 404 are held by an investor 402. The collective investment vehicle 404 holds asset securities 405, which are preferably fund-issued securities associated with mutual fund(s) 406. The fund(s) 406 holds underlying securities, which are typically company stocks and/or bonds obtained from the market/exchange 408 as shown in transaction 414. To obtain funds for a distribution, the collective investment vehicle 404 provides some of the fund-issued securities to the fund(s) 406 in exchange for fund underlying securities as shown in transaction 416. As described elsewhere herein, the CIV 404 may provide redemption instructions to fund 406 using a number of electronic messaging systems, depending on what interfaces are provided by the fund 406. The collective investment vehicle 404 then sells the fund underlying securities for cash in the market/exchange 408 as shown by transaction 418 (e.g., transmitting electronic trade messages via order processing server 126 indicating the security and the quantity and the desired trade parameters (security identifier, quantity, all or none, market order or limit price, order duration, etc.). The collective investment vehicle 404 receives notification of an electronic funds transfer. It also provides a cash distribution via e.g., an electronic funds transfer, to the holders of the collective investment vehicle securities as shown by transaction 420. Of course, the electronic funds transfer may utilize DTC facilities whereby the funds are transferred to the DTC for distribution to the shareholders according to dividend instruction data also transmitted to the DTC. Alternatively, the cash distribution may be applied to a distribution reinvestment program if desired. The collective investment vehicle 404 may take the form of a cash-flow mutual fund (CF-MF) as shown in FIG. 5, or a cash-flow exchange traded fund (CF-ETF) as shown in FIG. 6.

With respect to FIG. 5, the CF-MF will be described. The collective investment vehicle 504 issues collective investment securities to investor 502 in exchange for cash, as shown by transaction 510. Collective investment vehicle 504 then purchases fund-issued securities from fund(s) 506 in exchange for cash as shown in transaction 512. The purchase of the fund-issued securities is done by transmitting electronic trade requests by system 102 for execution. Fund(s) 506 adjusts its assets as necessary by buying additional securities from market/exchange 508 as shown by transaction 514.

In order to obtain funds for a distribution event, collective investment vehicle 504 provides the fund-issued securities to fund(s) 506 in exchange for fund underlying securities as shown by transaction 516. Transaction 516 is preferably a like-kind exchange for which fund 506 does not incur a tax realization event. Transaction 516 is implemented via computer algorithm including issuing electronic messages to the DTC to indicate that shares were redeemed and have been effectively closed out or terminated, and that the fund underlying securities have been transferred via, e.g., a book entry transfer message. Collective investment vehicle 504 may then liquidate the fund underlying securities on the market/exchange 508 as shown by transaction 518 (again, via electronic order messages). Collective investment vehicle 504 then provides the cash distribution to investor 500 as shown by transaction 520, and as described elsewhere herein. In transaction 518 and 520, the computer system 102 (e.g., CIV management server 134) of collective investment vehicle 510 makes a memo entry in a database for profit and loss associated with the transactions, wherein the fund-issued securities are preferably high basis mutual fund shares and the fund underlying securities are preferable low basis securities, in one embodiment.

The collective investment vehicle 504 may offer an optional distribution reinvestment program as shown by decision block 524. If the distribution reinvestment option is selected, the distribution funds may be used to acquire additional collective investment securities from collective investment vehicle 504 or any other collective investment vehicle 526 offered as part of the reinvestment plan.

The CF-ETF will be described with respect to FIG. 6. Authorized participant (AP) 604 provides cash to the collective investment vehicle 610 in exchange for collective investment securities as shown by transaction 616. The collective investment vehicle 610 forms a basket of fund-issued securities by purchasing them from fund(s) 606 as shown in transaction 614. The collective investment vehicle 610, through this creation event, generates the collective investment securities provided to the AP 604 in transaction 616 via DTC electronic messaging as described herein. The AP 604 then provides the collective investment securities to investors 602 in exchange for cash as shown by transaction 612. Alternatively, investor 602 may obtain collective investment securities from the secondary market through market/exchange 608 (not shown). Of course, the fund(s) 606 purchases the necessary fund underlying securities from the market/exchange 608 as shown by transaction 618.

In an alternative embodiment, the AP 604 may in transaction 617 deposit securities of the fund(s) 606 with the collective investment vehicle in exchange for the collective investment securities. That is, the AP 604 may transfer ownership (such as through a book entry transfer via electronic messaging to the DTC) of the fund-issued securities to the collective investment vehicle.

As part of a distribution event, the collective investment vehicle 610 provides fund-issued securities to fund(s) 606 in exchange for fund underlying securities as shown in transaction 620, as described elsewhere herein. This is preferably treated as a like-kind exchange for the fund(s) 606, and is not a realization event for purposes of determining taxes due by the fund(s) 606. The collective investment vehicle 610 then liquidates the fund underlying securities on the market/exchange 508 as shown by transaction 618. In transaction 618 and 620, the computer system 102 (e.g., CIV management server 134) of collective investment vehicle 610 makes a memo entry in a database for profit and loss associated with the transactions, wherein the fund-issued securities are preferable high basis mutual fund shares and the fund underlying securities are preferable low basis securities.

In addition, the collective investment vehicle 610 may offer an optional distribution reinvestment program as shown by decision block 626. If the distribution reinvestment option is selected, the distribution funds may be used to acquire additional collective investment securities from collective investment vehicle 610 or any other collective investment vehicle 628 offered as part of the reinvestment plan.

Figure 7A:
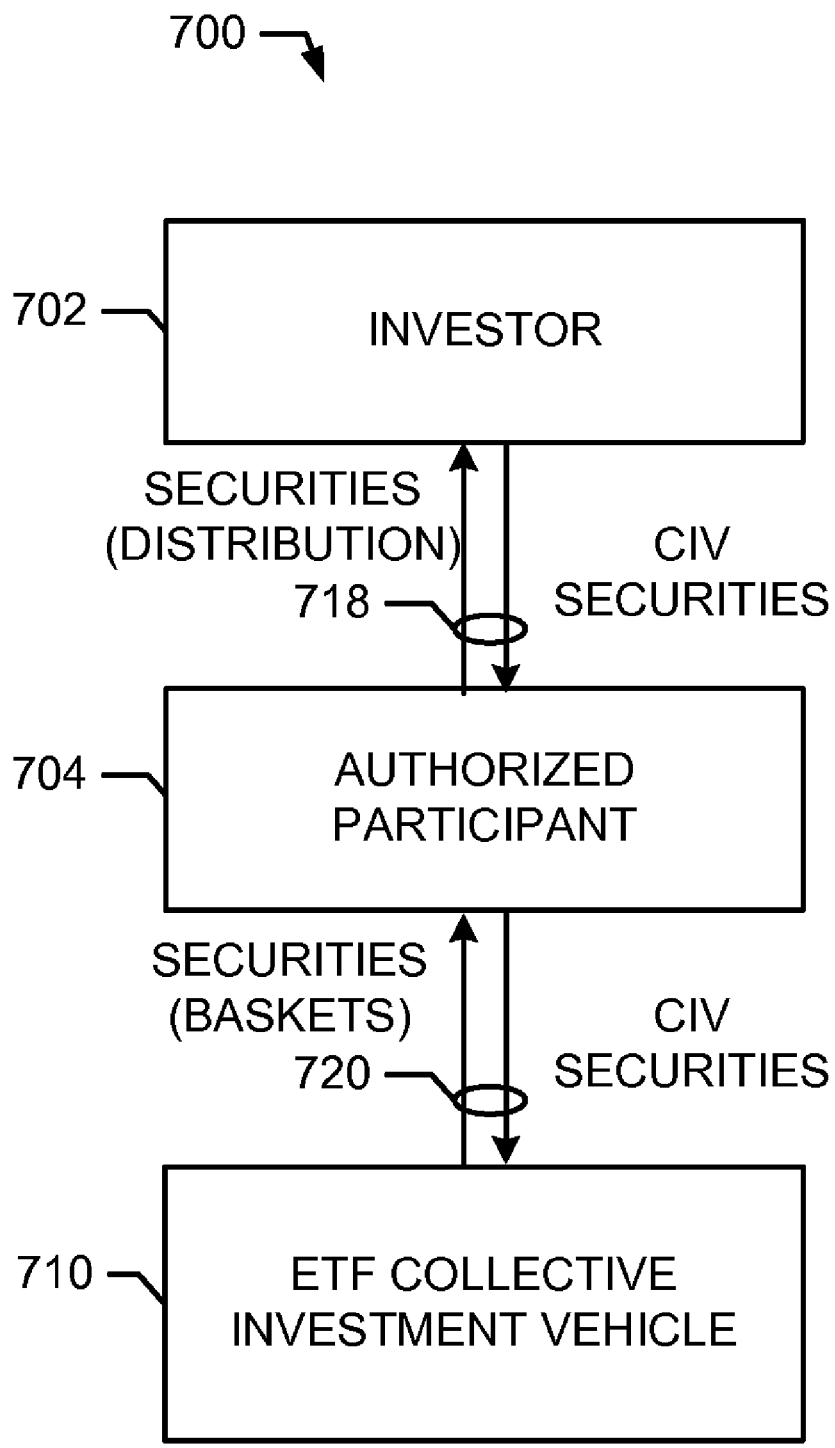
FIG. 7A is a block diagram depicting one embodiment of ETF redemption transactions.

A preferred redemption event 700 is depicted in FIG. 7A for the cash-flow exchange traded fund (CF-ETF). In 700, AP 804 may obtain collective investment vehicle securities (CIV securities) from one or more investors 702. The AP 704 may then exchange the CIV securities for baskets of securities with the ETF collective investment vehicle 710 as shown in transaction 720. AP 704 may then distribute the baskets of securities to the one or more investors 702. The investors 702 may then liquidate the securities on the market/exchange (not shown). Transactions 718 and 720 are accomplished via a book entry transfer as known to those of skill in the art and as described herein. In the preferred redemption transactions, the AP 704 receives the baskets of securities in an in-kind exchange for the collective investment vehicle securities in transaction 720. Similarly, the AP 704 obtains the CIV securities from investors 702 in an in-kind exchange transaction 718.

Figure 7B:
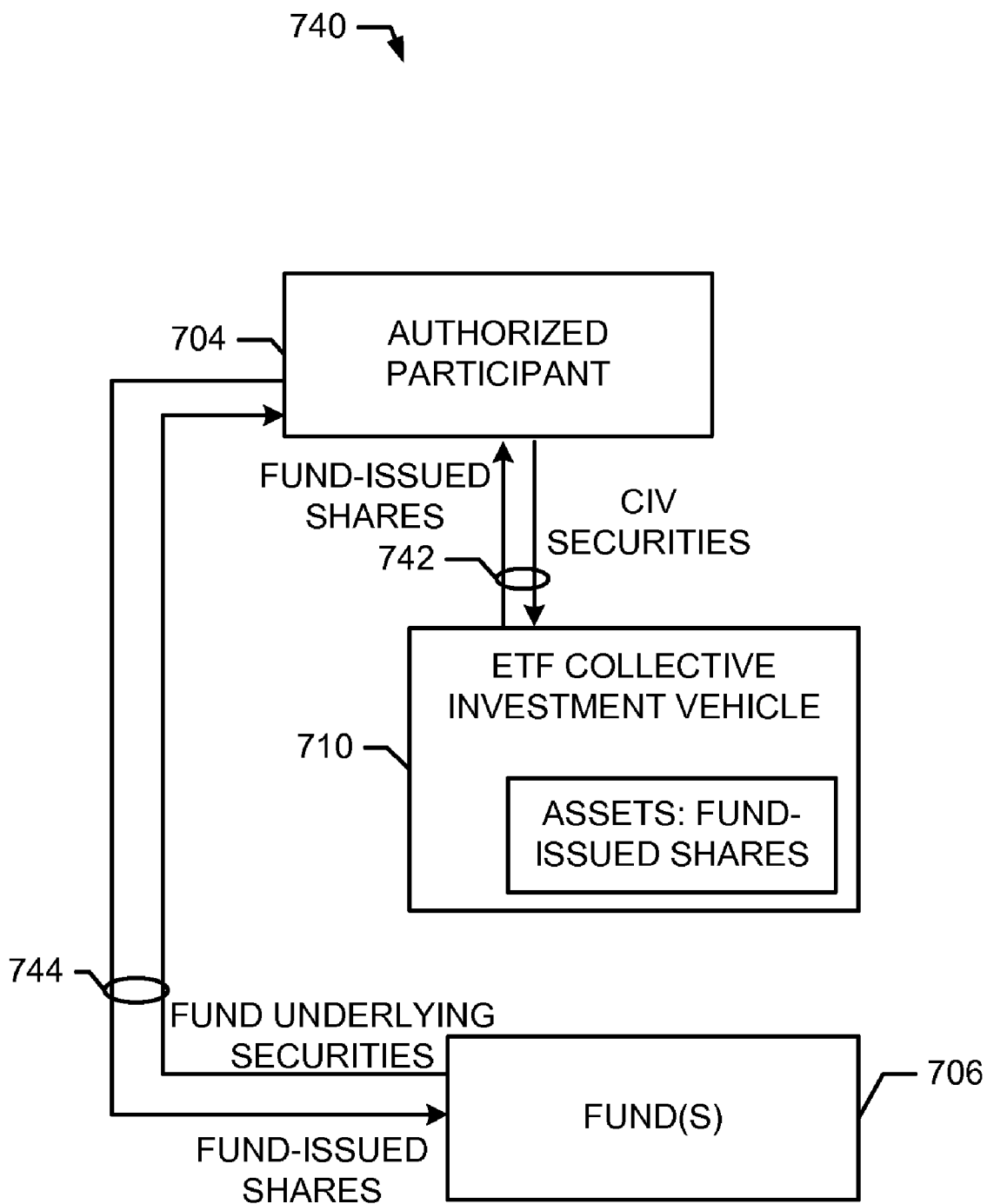
FIG. 7B is a block diagram depicting an alternative embodiment of ETF redemption transactions.

The alternative CF-ETF redemption event 740 will be described with respect to FIG. 7B. AP 704 may obtain collective investment vehicle securities (CIV securities) through the market/exchange (not shown). The AP 704 may then exchange the collective investment vehicle securities for fund-issued shares with the ETF collective investment vehicle 710 as shown in transaction 742. AP 704 may then redeem the fund-issued shares and receive fund underlying securities from fund(s) 706 as shown in transaction 744. AP 704 may then liquidate the fund underlying securities on the market/exchange (not shown).

In certain preferred embodiments, transaction 742 is accomplished via a book entry transfer as known to those of skill in the art. In the preferred redemption transactions, the AP 704 receives the fund-issued shares in an in-kind exchange for the collective investment vehicle securities. Similarly, AP 704 then redeems the fund-issued shares in a like-kind exchange for the fund underlying securities.

Figure 8:
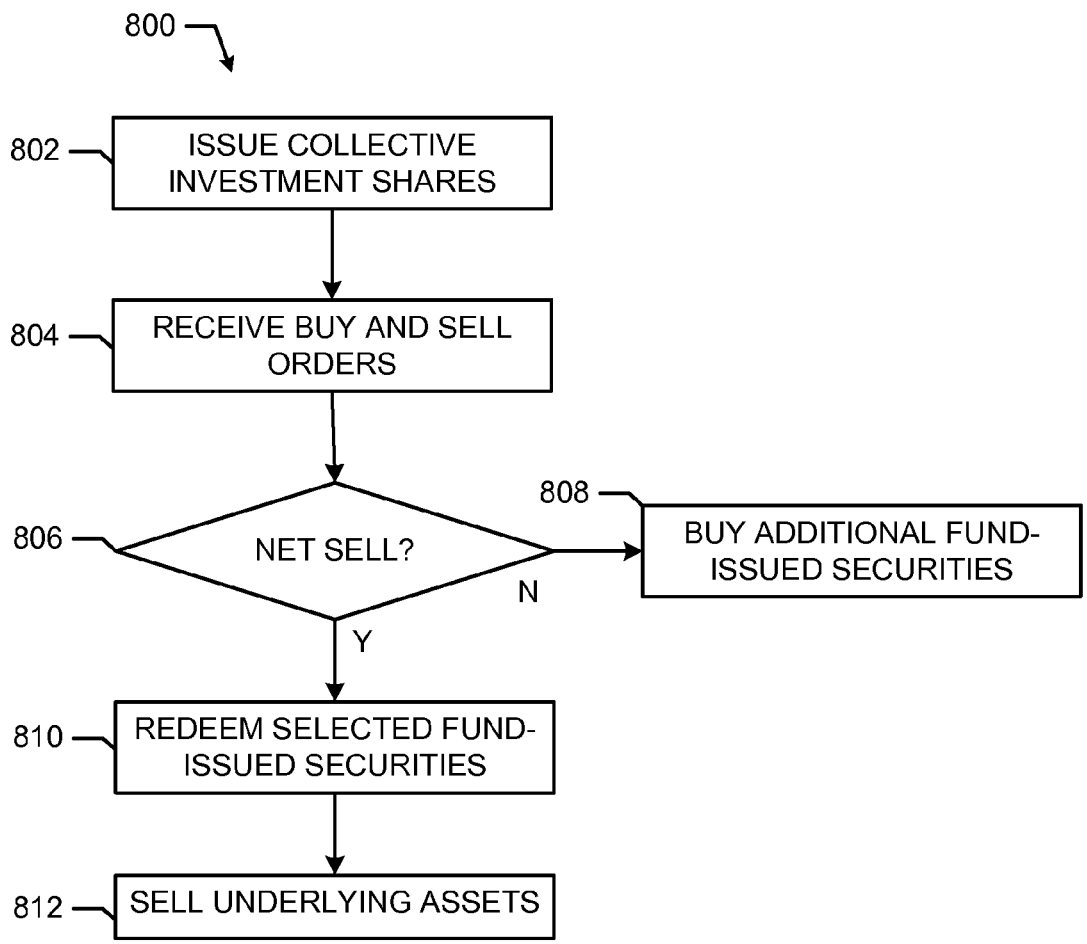
FIG. 8 is a flow chart depicting a method of collective investment vehicle administration including order aggregation.

With respect to order aggregation, a preferred method 800 of administering a collective investment vehicle will be described, as shown in FIG. 8. At step 802, the collective investment vehicle issues shares. The collective investment vehicle shares are preferably held by individual or institutional investors. At step 804, orders to buy and sell the collective investment vehicle shares are received at the order processing server 126 via the networks 120 and the connections 122. The buy and sell orders may be received directly by the collective investment vehicle company, or through an exchange. At step 806 it is determined whether the combined orders are a net buy order or a net sell order. If the net order is a buy order, then the collective investment vehicle buys additional fund-issued shares as shown at step 808. If, on the other hand, the net order is a sell order, then the collective investment vehicle redeems selected fund-issued securities as shown in step 810. As discussed above, the redemption of fund-issued securities for the underlying fund assets is a like-kind exchange for which the fund does not incur a capital gain. At step 812, the underlying fund assets are liquidated in order to receive money needed to fulfill the net sell order.

An exemplary embodiment of the invention has been described above. Those skilled in the art will appreciate that changes may be made to the embodiment described without departing from the true spirit and scope of the invention as defined by the claims.

We claim:

1. A method of administering an exchange traded fund (ETF) comprising:
   - issuing ETF securities associated with an ETF, the ETF securities having a value and the ETF having asset securities;
   - determining whether a trigger event has occurred;
   - when the trigger event has occurred, determining a target distribution amount for the ETF;
   - an ETF computing device (i) electronically querying a database to obtain asset security data for the asset securities and (ii) analyzing the asset security data to identify which of the asset securities to redeem in order to obtain distribution funds sufficient to pay the target distribution amount;
   - transmitting electronic trade messages to redeem the identified asset securities;
   - receiving the distribution funds from the redemption of the identified asset securities sufficient to pay the target distribution amount;
   - providing the distribution funds to one or more holders of the ETF securities; and
   - resetting the value of ETF securities based on the distribution funds provided.

2. The method of claim 1 wherein the trigger event is a calendar event.

3. The method of claim 2 wherein the calendar event is a periodic event having a period selected from the group consisting of one day, one week, one month, one-half month, one quarter, one year, or one-half year.

4. The method of claim 1 wherein determining whether a trigger event has occurred comprises:
   - the ETF computing device (i) querying a data store to obtain asset security quantity and price data, (ii) calculating a total value of the asset securities, and (iii) determining a change in value of the asset securities; and
   - the ETF computing device determining that the change in value exceeds a threshold.

5. The method of claim 1 wherein determining whether a trigger event has occurred comprises receiving an electronic message containing the value of an economic indicator and comparing the value of the economic indicator to a predetermined value.

6. The method of claim 5 wherein the economic indicator is selected from the group consisting of federal funds rate, inflation rate, unemployment number, unemployment rate, personal income, US Treasury yields, consumer credit level, gross domestic product, housing starts, stock index, or the price of at least one security.

7. The method of claim 1 wherein the selected asset securities are selected at least in part in response to the target distribution amount.

8. The method of claim 1 wherein the step of redeeming selected asset securities to obtain distribution funds comprises selling the selected asset securities for cash.

9. The method of claim 1 wherein the asset securities comprise shares of at least one mutual fund, and wherein redeeming selected asset securities to obtain distribution funds comprises exchanging selected shares of the at least one mutual fund for a portion of the fund's underlying securities, and selling the underlying securities.

10. The method of claim 9 wherein the portion of the fund's underlying securities comprises those securities held by the mutual fund at a relatively low cost basis.

11. The method of claim 1 wherein analyzing the asset security data includes determining the affect on earnings and profits (E&P) of the available asset securities.

12. The method of claim 1 wherein the ETF securities are ETF shares, and further comprising performing a reverse split in the ETF shares in the event of a loss of value of the asset securities.

13. The method of claim 1 further comprising providing a distribution fund reinvestment plan.

14. The method of claim 1 wherein the asset securities are shares of at least one mutual fund.

15. The method of claim 1 wherein the asset securities comprise shares of at least one fund; and wherein transmitting electronic trade messages from a computer to redeem the identified asset securities in order to obtain the distribution funds comprises:
   - transmitting an electronic request to redeem an amount of the shares of at least one fund in exchange for underlying fund securities; and
   - transmitting electronic transaction messages to sell the underlying fund securities to obtain the distribution funds.

16. The method of claim 1 wherein ETF is a multiple-share class company.

17. The method of claim 1 wherein redeeming is performed periodically.

18. The method of claim 1 wherein the ETF issues multiple classes of securities, and wherein the target distribution amount is set according to the particular class of securities.

19. The method of claim 1 wherein the selected asset securities are selected at least in part in response to the trigger event.

* * * * *